US011335094B2

(12) United States Patent
Horton et al.

(10) Patent No.: US 11,335,094 B2
(45) Date of Patent: May 17, 2022

(54) DETECTING FAKE VIDEOS

(71) Applicant: XNOR.ai, Inc., Seattle, WA (US)

(72) Inventors: Maxwell Christian Horton, Seattle, WA (US); Ali Farhadi, Seattle, WA (US)

(73) Assignee: Apple Inc., Cupertino, CA (US)

( * ) Notice: Subject to any disclaimer, the term of this patent is extended or adjusted under 35 U.S.C. 154(b) by 232 days.

(21) Appl. No.: 16/539,430

(22) Filed: Aug. 13, 2019

(65) Prior Publication Data

US 2021/0049366 A1    Feb. 18, 2021

(51) Int. Cl.
| | |
|---|---|
| *G06K 9/46* | (2006.01) |
| *G06K 9/66* | (2006.01) |
| *G06V 20/40* | (2022.01) |
| *G06T 7/44* | (2017.01) |
| *G06K 9/62* | (2022.01) |
| *G06T 7/13* | (2017.01) |
| *G06N 20/00* | (2019.01) |

(52) U.S. Cl.
CPC ........... *G06V 20/46* (2022.01); *G06K 9/6256* (2013.01); *G06N 20/00* (2019.01); *G06T 7/13* (2017.01); *G06T 7/44* (2017.01); *G06V 20/49* (2022.01)

(58) Field of Classification Search
CPC .......... G06K 9/00744; G06K 9/00765; G06K 9/6256; G06K 9/627; G06K 9/4642; G06K 9/6215; G06K 9/00288; G06K 9/00899; G06T 7/44; G06T 7/13; G06N 20/00
See application file for complete search history.

(56) References Cited

U.S. PATENT DOCUMENTS

| | | | |
|---|---|---|---|
| 2010/0104158 A1* | 4/2010 | Shechtman | G06K 9/46 382/131 |
| 2010/0166260 A1* | 7/2010 | Huang | G06K 9/3241 382/103 |

(Continued)

OTHER PUBLICATIONS

Lin, Guo-Shiang et al., "Detection of frame duplication forgery in videos based on spatial and temporal analysis", International Journal of Pattern Recognition and Artificial Intelligence, pp. 1-27 • Feb. 2013.*

(Continued)

*Primary Examiner* — Samir A Ahmed
(74) *Attorney, Agent, or Firm* — BakerHostetler

(57) ABSTRACT

In one embodiment, a method includes accessing a plurality of verified videos depicting one or more subjects, generating, based on the verified videos, a plurality of verified-video feature values corresponding to the subjects, generating, using one or more video transformations based on the verified videos, a plurality of fake videos, generating, based on the fake videos, a plurality of fake-video feature values, training a machine-learning model to determine whether a specified video is a genuine video, wherein the machine-learning model is trained based on the verified-video feature values and the fake-video feature values. The machine-learning model may be trained to classify the specified video in a genuine-video class or a fake-video class, and the machine-learning model maybe trained based on an association between a genuine-video class and the verified-video feature values and an association between a fake-video class and the fake-video feature values.

20 Claims, 5 Drawing Sheets

(56) References Cited

U.S. PATENT DOCUMENTS

| | | | |
|---|---|---|---|
| 2016/0267664 A1* | 9/2016 | Davis | G06T 7/251 |
| 2019/0037173 A1* | 1/2019 | Lee | H04W 4/18 |
| 2019/0065818 A1* | 2/2019 | Lee | G06T 5/003 |
| 2020/0036528 A1* | 1/2020 | Ortiz | G06N 3/08 |
| 2020/0097643 A1* | 3/2020 | Uzun | G06K 9/00899 |
| 2020/0117906 A1* | 4/2020 | Lee | G06K 9/00758 |
| 2020/0286293 A1* | 9/2020 | Jia | G06T 7/529 |
| 2021/0042529 A1* | 2/2021 | Price | G06K 9/00281 |
| 2021/0097260 A1* | 4/2021 | Verma | G06K 9/00765 |
| 2021/0117650 A1* | 4/2021 | Ye | G06N 3/0454 |

OTHER PUBLICATIONS

Cho, Miyoung et al., "Face recognition performance comparison between fake faces and live faces", Soft Comput (2017) 21:3429-3437.*

Benlamoudi, Azeddine et al. "Face spoofing detection using Local binary patterns and Fisher Score" 2015 3rd International Conference on Control, Engineering & Information Technology (CEIT). IEEE, 2015.*

Akhtar, Zahid et al., Liveness Detection for Biometric Authentication in Mobile Applications, 2014 International Carnahan Conference on Security Technology (ICCST). IEEE, 2014.*

Tariq, Shahroz et al. "Detecting Both Machine and Human Created Fake Face Images In the Wild", Proceedings of the 2nd international workshop on multimedia privacy and security. 2018.*

Chiu, Chih-Yi et al. "Time-Series Linear Search for Video Copies Based on Compact Signature Manipulation and Containment Relation Modeling", IEEE Transactions on circuits and systems for video technology 20.11 (2010): 1603-1613.*

\* cited by examiner

DETECTING FAKE VIDEOS

TECHNICAL FIELD

This disclosure generally relates to use of machine-learning to improve video-based authentication.

BACKGROUND

Systems relying upon facial recognition to perform authentication and authorization may require a person to present their face to a camera in order to verify that the person's face matches that of an authorized user. The person may attempt to gain unauthorized access to a computer system that uses such a facial recognition-based authentication process by holding up a life-size picture of the authorized user's face. Recognizing that the facial image is not a live image of the authorized user being captured in real time may be difficult. If the authentication process simply grants access based on recognizing the face of the authorized user, then access may mistakenly be granted to an unauthorized party.

Machine-learning techniques, including neural networks, may be applied to some computer vision problems. Neural networks may be used to perform tasks such as image classification, object detection, and image segmentation. Neural networks have been trained to classify images using large datasets that include millions of images with ground truth labels.

SUMMARY OF PARTICULAR EMBODIMENTS

In particular embodiments, an authentication system may detect fake videos during an authentication procedure by using a machine-learning model trained to distinguish between fake videos depicting subjects who are not authorized to access resources protected by the system, and a genuine videos depicting one or more subjects who are authorized to access the resources. The authentication system may be used for video-based authentication, in which a video of a subject is captured by a camera and analyzed to determine whether the subject is authorized to access a protected resource such as a mobile device or other computer system. The authentication system may grant access upon receiving a video that genuinely depicts an authorized user, such as a video captured by the camera when the authorized user is physically present in front of the camera for a period of time. The disclosed authentication system may determine whether a given video is a genuine video of an authorized user by providing the video as input to a machine-learning model trained to recognize the difference between real and fake videos. If the video is genuine, then the identity of the subject may be verified, e.g., using face recognition. If the identity verification determines that the subject is an authorized user, then access to the protected resource may be granted. Access may be granted according to permissions associated with the subject. The permissions may be associated with a user account of the authorized user, for example.

In particular embodiments, genuine videos may by videos that are live, e.g., are being captured at the time they are provided to the authentication system, or were captured less than a threshold time prior to being provided to the authentication system (e.g., less than 1 second, 5 seconds, or 15 seconds prior to being provided to the authentication system). Genuine videos may depict movement of the subject, such as movement of the subject's facial features. Thus, videos of an authorized user that do not depict movement may be categorized as fake videos.

In particular embodiments, genuine videos may be videos that depict an authorized user with the authorized user's knowledge. That is, a genuine video may be one the authorized user knows is to be used for authentication at or soon after the time the video is made. A video that is made without the authorized user's knowledge, e.g., by capturing a genuine video in another video that is presented for authentication, is likely to be a fake video. Thus, genuine videos may be videos that directly depict the subject, e.g., are not videos of other videos or images that depict the subject. For example, a video in which the only depiction of the authorized user is in an embedded video or still image of the authorized user may not be a genuine video of the authorized user. The still image may be a paper photo, or an image displayed on a screen of a mobile device, for example. As an example, a video depicting a screen that in turn depicts a video or still image of the authorized user is an example of a fake video. Similarly, a video depicting a paper photo of the authorized user is another example of a fake video.

In particular embodiments, the authentication system may train the machine-learning model to determine whether a video is a genuine video. The machine-learning model may be trained based on a dataset that includes a set of verified videos. The verified videos may include subjects such as users, including the users' faces. The model may be trained to distinguish between the verified videos and a set of fake videos. The fake videos may include one or more of the verified videos, so that the machine-learning model may learn to recognize fake videos depicting a screen that in turn depict pre-recorded videos of the authorized user. Alternatively or additionally, the fake videos may be generated using transformations that alter the verified videos, and the fake videos may be the results of the transformations. The transformation may include addition of noise, blurring, resolution reduction, color distortion, image compression, image resizing, overlaying of rectangular borders enclosing faces (e.g., to produce a picture-in-picture effect), stopping motion, or a combination of those.

In particular embodiments, to train the machine-learning model, the authentication system may generate a set of verified-video feature vectors based on the verified videos and a set of fake-video feature vectors based on the fake videos. The machine-learning model may be trained based on the verified-video feature vectors and the fake-video feature vectors. One or more computations may be performed based on the verified-video feature vectors to generate a first set of values, and one or more computations may be performed on the fake-video feature vectors to generate a second set of values. The machine-learning model may be trained to distinguish between the first set of values, which correspond to genuine videos, and the fake-video histograms, which correspond to fake videos.

In particular embodiments, the computations may include computing distances between the feature vectors. A set of verified-video distances may be determined based on distances between sequential pairs of the verified-video feature vectors, and a verified-video histogram may be generated based on the verified-video distances. Further, a set of fake-video distances may be determined based on distances between consecutive or non-consecutive pairs of the fake-video feature vectors, and a fake-video histogram may be generated based on the fake-video distances. The machine-learning model may be trained to distinguish between the verified-video histograms and the fake-video histograms.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
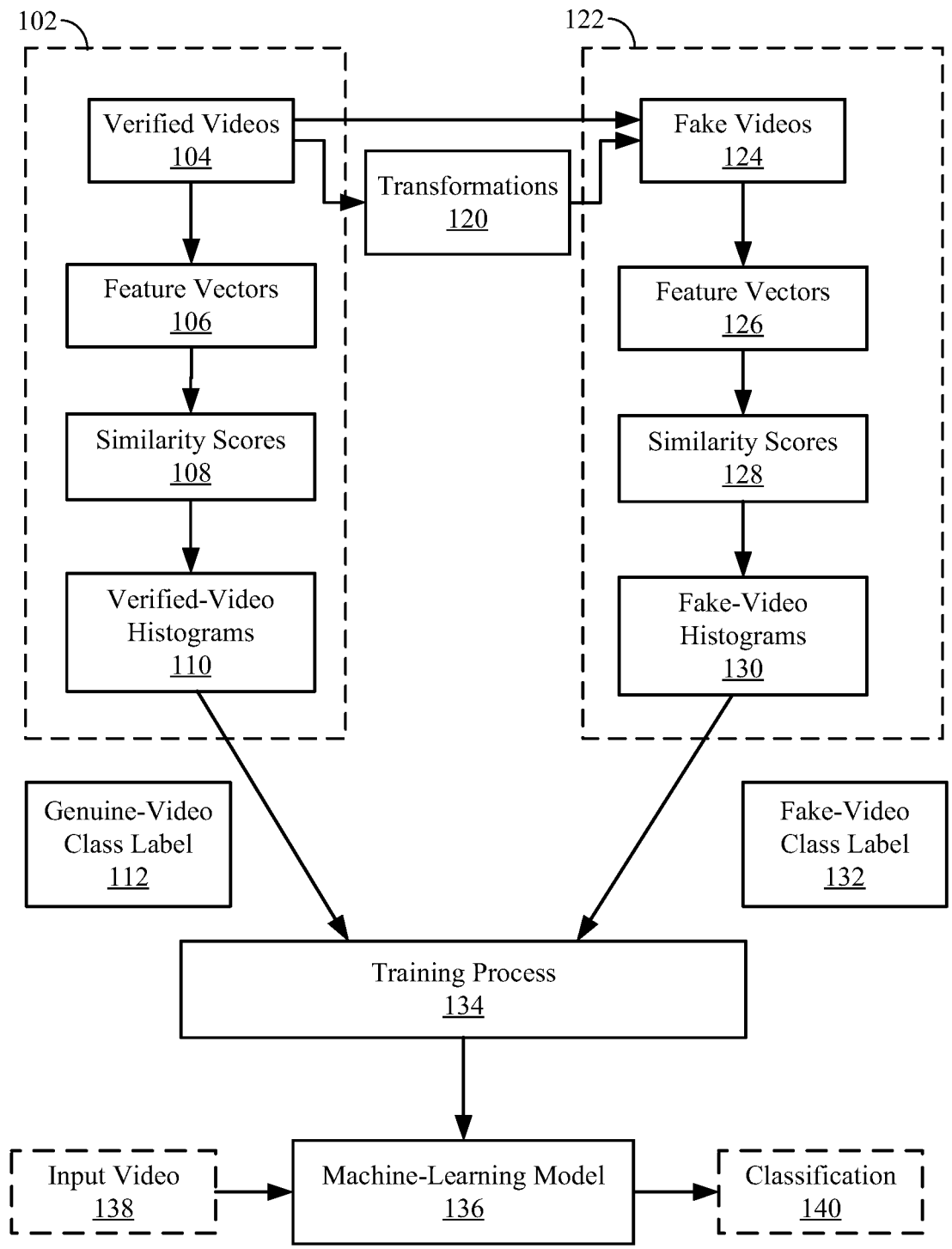
FIG. 1 illustrates an example genuine-video detection system.

FIG. 1 illustrates example genuine-video detection system 100. In particular embodiments, the genuine-video detection system 100 includes a verified-video pipeline 102 and a fake-video pipeline 122. The verified-video pipeline 102 receives one or more verified videos 104 and generates one or more feature vectors 106 based on the verified videos 104. For example, a set of four feature values F1, F2, F3, and F4 may be calculated for each frame in each verified video 104. The feature values may be stored in a feature vector [F1, F2, F3, F4] for each frame. In particular embodiments, each of the verified videos may be less than a threshold length. The threshold length may be, e.g., between 1 and 10 seconds. At least a portion of each of the subjects in the verified video may move at greater than a minimum threshold rate of speed. Each of the subjects in the verified videos may move at less than a threshold rate of speed.

In particular embodiments, the features may include color features, texture features, edge features, shape features, image quality features, or a combination of those. The color features may include HSL (hue, saturation, lightness), HSV (hue, saturation, value), dominant color, color gradient, color frequency histogram, or a combination of those. The texture features may include coarseness, contrast, directionality, line-likeness, regularity, roughness, Grey Level Co-occurrence Matrix (GLCM), or a combination of those. The edge features may include an edge histogram based on spatial distribution of edges. The shape features may include a region-based shape feature based on pixel distribution in an object or region, a contour-based shape feature based on contours of an object, one or more Hu-Moment shape features, or a combination of those. The image quality features may include distortion, contrast, brightness, or a combination of those.

Similarity scores 108 may be calculated between each sequential pair of feature vectors 106 (e.g., representing similarity between sequential frames according to the feature values). The similarity scores 108 may be, e.g., Euclidean distances, cosine similarity scores, or other suitable similarity measure. Sequential pairs of feature vectors 106 may correspond to sequential frame of a video 104. Sequential frames may be consecutive frames, or may be separated by one or more frames, e.g., every nth frame.

In particular embodiments, a verified-video histogram 110 may be generated for each verified video 104 based on similarity scores 108 calculated for the verified video 104. For example, the possible values of the similarity scores 108 (e.g., normalized floating-point values between 0 and 1) may be divided into ranges, and the frequency of scores in each range in the verified-video histogram 110 may be determined based on the number of calculated scores in the range. There may be a separate histogram 110 for each video 104, or a single histogram 110 may be generated based on multiple videos 104.

In particular embodiments, the fake-video pipeline 122 may generate one or more fake videos 124. The fake videos may be generated based on the verified videos 104 using one or more transformations 120, e.g., by transforming the frames of at least one of the verified videos 104 using an image or video transformation to generate one or more frames of each of the fake videos 124. The transformations 120 may include, for example, addition of noise, blurring, resolution reduction, color distortion, image compression, image resizing, overlaying of rectangular borders enclosing faces (e.g., to produce a picture-in-picture effect), stopping motion, or the like. Image resizing may be used to reduce the size of each frame in a verified video 104 to simulate an embedded image video (e.g., a video of a video) such as the still image of the paper photo 506 in FIG. 5B, the still image of the screen 510 in FIG. 5C, or the embedded video of the screen 514 in FIG. 5D. The transformations may also apply simulated glare effects to a portion of the verified video, such as the reduced-size frames, to emulate the glare that may be produced when a video is captured of a screen as shown in FIGS. 5C and 5D. The transformations may also overlay borders around faces detected in the verified video or in the reduced-size frames to simulate the borders of a paper photo 506, still image 510, or video 512. As another example, the transformations may stop the motion in the verified video using a freeze-frame effect to simulate a still image such as the paper photo 506 or still image 510. The fake videos generated based on the effects produced by the transformations 120 may be used to train a machine-learning model to detect fake videos, since fake videos may contain similar effects. As a further example, the transformations may include affine transformations to the images in the verified videos. The affine transformations may simulate small amounts of motion. In particular embodiments, the transformations 120 may be bypassed (or may include an identity transformation that does not modify its input), as shown by the line connecting the verified videos 104 to the fake videos 124. The transformation 120 may be bypassed for one or more of the verified videos 104, e.g., to represent fake videos 124 that appear to be unmodified copies of the verified videos 104.

Alternatively or additionally, the fake videos 124 may be generated by transforming one or more still images of subjects to form one or more transformed images and using the transformed images as frames in the fake videos 124. The still images of the subjects may be generated based on subjects identified in the verified videos 104 and transforming the subjects. The subjects may be transformed by, for example, animating the subjects. The fake videos 124 may be generated using transformations that degrade the quality of the still images. The transformation may include addition of noise, blurring, resolution reduction, color distortion, image compression, or a combination of those. The transformation may be bypassed for one or more of the still images, e.g., to represent fake videos 124 that appear to be unmodified copies of still images.

In particular embodiments, the fake-video pipeline 122 generates one or more feature vectors 126 based on the fake videos 124. The feature vectors 126 for the fake videos 124 may correspond to the same features as the feature vectors 106 calculated for the verified videos 104. For example, a feature vector [F1, F2, F3, F4] may be calculated for each frame in each fake video 124. Similarity scores 128 may be calculated between each sequential pair of feature vectors 126. In particular embodiments, a fake-video histogram 130 may be generated for each fake video 124 based on similarity scores 128 calculated for the fake video 124 (similarly to the calculation of verified-video histograms 110 described above). There may be a separate histogram 130 for each video 124, or a single histogram 130 may be generated based on multiple videos 124.

In particular embodiments, a training process 134 may train a machine-learning model 136, which may be a classifier or other suitable type of machine-learning model. The training process 134 may use the verified-video histograms 110 in association with a genuine-video class label 112 to train the machine-learning model 136 to classify input videos 138 having histograms similar to the verified-video histogram 110 as being in the genuine-video class. Further, the training process 134 may use the fake-video histograms 130 in association with a fake-video class label 132 to train the machine-learning model 136 to classify input videos 138 having histograms similar to the fake-video histogram 130 as being in the fake-video class. The machine-learning model 136 may output the class determined for the input video 138 as a classification 140. The trained machine-learning model may be used to determine whether an input video a genuine video by classifying the input video. The classification produced by the model may be either "genuine video" or "fake video." Although the machine-learning model is described as being a classifier that classifies the videos into two classes, the machine-learning model may be any suitable type of model, and may produce any suitable type of output that can distinguish between real and fake videos.

Figure 2:
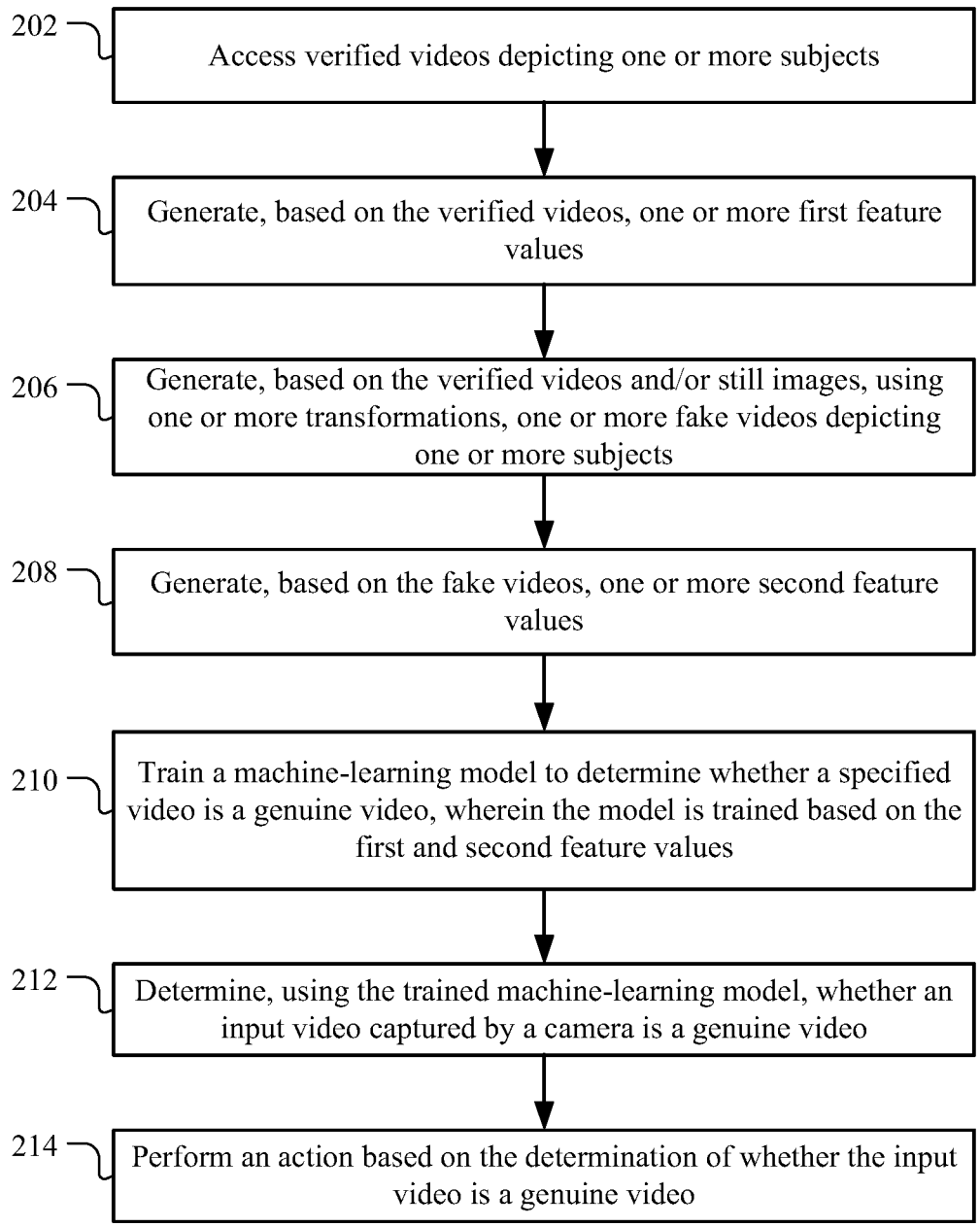
FIG. 2 illustrates an example method for training and using a genuine-video detection system.

FIG. 2 illustrates an example method 200 for training a genuine-video detection system. The method may begin at step 202, where the genuine-video detection system may access a set of verified videos depicting one or more subjects. At step 204, the genuine-video detection system may generate, based on the verified videos, a plurality of verified-video feature values. The feature values may correspond to the subjects, or may be generated based on the verified video frames. At optional step 206, the genuine-video detection system may generate a set of fake videos depicting one or more subjects. Each fake video may be generated using one or more optional transformations at step 206. The transformations, if performed, may be based on the verified videos, based on one or more still images that are generated based on the verified videos, or based on the verified videos 104 and on the one or more still images. Step 206 may be bypassed for one or more of the verified videos 104, e.g., to include in the training data examples of videos depicting screens that in turn depict a non-transformed video or still image of the authorized user. Such videos depicting screens may correspond to fake videos 124 produced when an unauthorized user holds a device's screen displaying a pre-recorded video of an authorized user up to a camera. Such fake videos 124 based on displayed pre-recorded videos do not necessarily involve transformations 120 of frames, so the training data for the machine-learning model may include one or more of the verified videos 104 (or alternatively, one or more fake videos 124 that are copied from one or more of the verified videos 104 without using transformations 120). Thus, one or more of the fake videos 124 may be the same as one or more of the verified videos 104 (or the fake videos 124 may not be generated when the transformation 120 is bypassed). At step 208, the genuine-video detection system may generate a plurality of fake-video feature values. The fake-video feature values may be generated based on the fake videos 124 (or based on the verified videos 104 when the transformation 120 is bypassed). The fake-video feature values may correspond to the subjects depicted in the fake videos, or may be generated based on the fake video frames. If the transformation 120 is bypassed for a particular verified video 104 as described above, then the fake-video feature values may be based on the verified videos 104, and fake videos 124 need not be generated.

At step 210, the genuine-video detection system may train a machine-learning model to determine whether a specified video is a genuine video. The machine-learning model may be trained based on the verified-video feature values and the fake-video feature values. As an example, the machine-learning model is trained based on an association between a genuine-video class and the verified-video feature values and an association between a fake-video class and the fake-video feature values.

At step 212, the genuine-video detection system may determine, using the trained machine-learning model, whether the input video is a genuine video. At step 214, the genuine-video detection system may perform an action based on the determination of whether the input video is a genuine video. For example, if the machine-learning model determines that the input video is a genuine video, then the genuine-video detection system may, upon successfully matching the subject depicted in the genuine video to the identity of an authorized user, cause an authentication system grant access to a protected resource.

Particular embodiments may repeat one or more steps of the method of FIG. 2, where appropriate. Although this disclosure describes and illustrates particular steps of the method of FIG. 2 as occurring in a particular order, this disclosure contemplates any suitable steps of the method of FIG. 2 occurring in any suitable order. Moreover, although this disclosure describes and illustrates an example method for training a genuine-video detection system including the particular steps of the method of FIG. 2, this disclosure contemplates any suitable method for training a genuine-video detection system including any suitable steps, which may include all, some, or none of the steps of the method of FIG. 2, where appropriate. Furthermore, although this disclosure describes and illustrates particular components, devices, or systems carrying out particular steps of the method of FIG. 2, this disclosure contemplates any suitable combination of any suitable components, devices, or systems carrying out any suitable steps of the method of FIG. 2.

Figure 3:
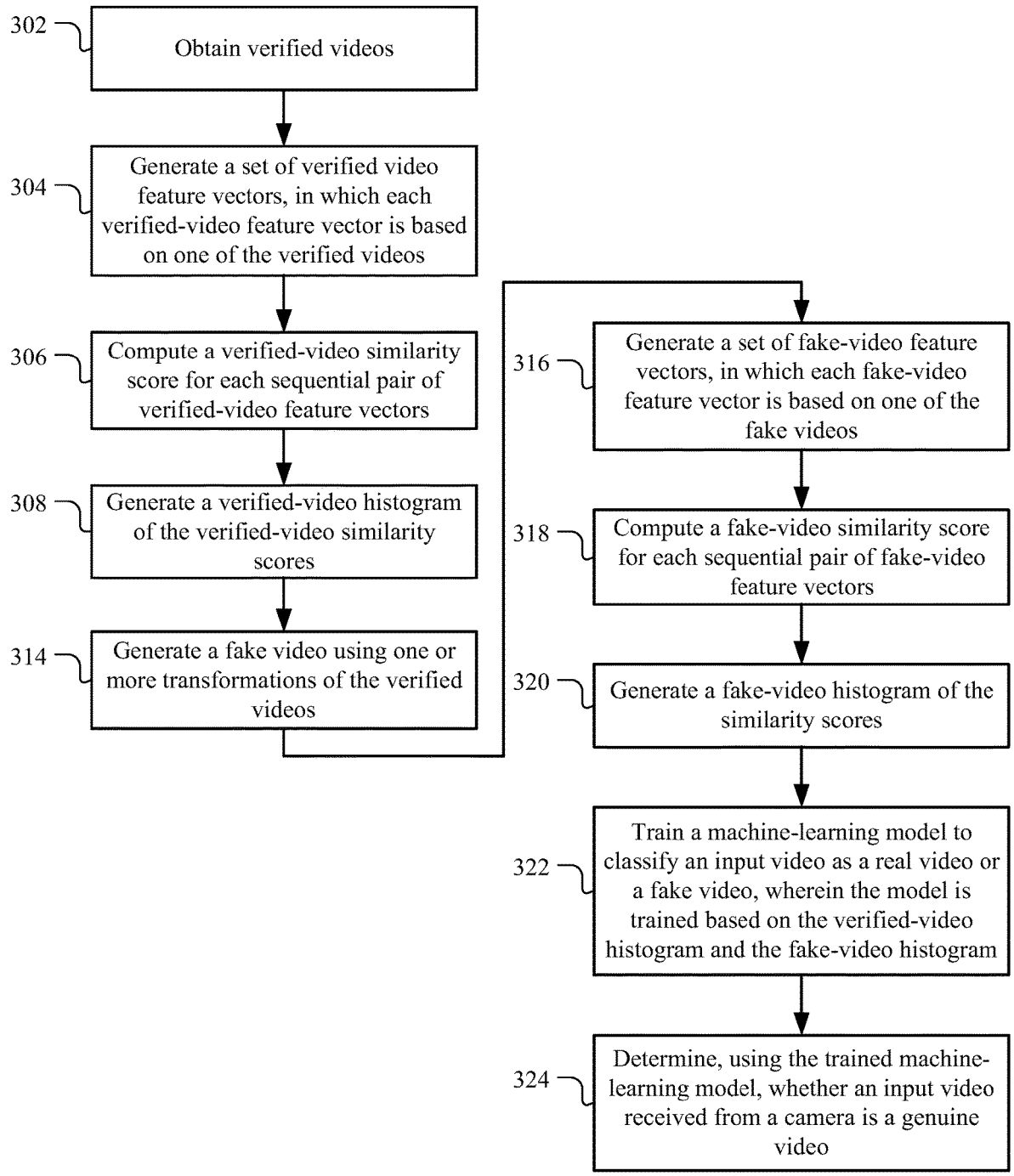
FIG. 3 illustrates an example method for training and using a genuine-video detection system.

FIG. 3 illustrates an example method 300 for training a genuine-video detection system. The method may begin at step 302, where the genuine-video detection system may obtain verified videos depicting subjects. Each verified video may be, e.g., between 1-5 seconds in length. The verified videos may depict subjects who are relatively still, e.g., with slight movements, but the movements are within a threshold distance, such as 5 inches, or at less than a threshold rate, such as 10 inches per second.

At step 304, the genuine-video detection system may generate a set of verified-video feature vectors, in which each verified-video feature vector is based on one of the verified videos. At step 306, the genuine-video detection system may compute a verified-video similarity score for each sequential pair of verified-video feature vectors. The similarities may be calculated as, e.g., the Euclidean distance between each sequential pair of vectors, the cosine similarity between each sequential pair of vectors, or other suitable similarity measure. At step 308, the genuine-video detection system may generate a verified-video histogram of the verified-video similarity scores.

At step 314, the genuine-video detection system may generate a fake video having video frames that include one or more of the fake still images based on one or more transformations of one or more of the verified videos. The same transformed image may be used for multiple frames in a fake video, e.g., to produce a stop-motion effect that simulates a still image, in which case there may be no motion in the fake video for the duration of those frames.

At step 316, the genuine-video detection system may generate a set of fake-video feature vectors, in which each fake-video feature vector is based on one of the fake videos. At step 318, the genuine-video detection system may compute a fake-video similarity score for each sequential pair of fake-video feature vectors. At step 320, the genuine-video detection system may generate a fake-video histogram of the similarity scores.

At step 322, the genuine-video detection system may train a machine-learning model to classify an input video as a real video or a fake video, wherein the model is trained based on the verified-video histogram and the fake-video histogram. As an example, the model may be trained to classify the input video as being in a genuine-video class or a fake-video class, and the model may be trained based on an association between the verified-video histogram and the genuine-video class, and an association between the fake-video histogram and the fake-video class. At step 324, the genuine-video detection system may determine, using the trained machine-learning model, whether an input video received from a camera is a genuine video.

Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for training a genuine-video detection system including the particular steps of the method of FIG. 3, this disclosure contemplates any suitable method for training a genuine-video detection system including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

In particular embodiments, a genuine-video detection system as described herein may be used in conjunction with a facial-recognition system, wherein facial recognition is only performed once confirmation has first been received that the video is (e.g., has been classified as) a genuine video. Particular embodiments described herein may be performed using other subjects captured in video. For example, access to a secured area may be granted upon confirming that a genuine video was captured of a human eye, then identifying the eye as that of an authorized user based on matching an iris scan. In another example, a pet door in the back door of a house may be locked or unlocked based on confirming that a genuine video was captured of an animal approaching the pet door, then identifying the animal as the homeowner's dog.

Figure 4:
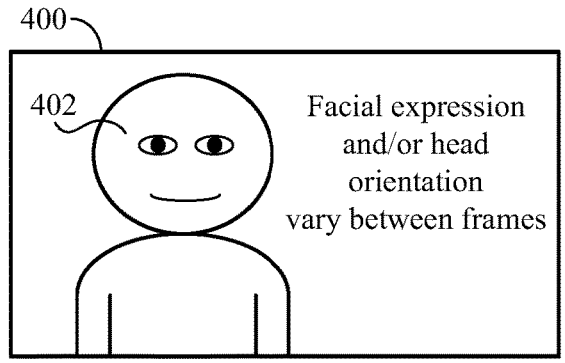
FIG. 4 illustrates an example genuine video depicting an authorized user.

FIG. 4 illustrates an example genuine video 400 depicting an authorized user 402. The video 400 includes multiple frames, one of which is shown. The frames depict the authorized user 402, including the authorized user's face. The facial expression shown on the face of the user 402, the orientation of the head of the user 402, or both, may vary between frames. The authorized user 402 is shown directly in the video 400, e.g., the video 500 does not include any portions of other videos depicting the authorized user 402. For example, the camera that captures the video 400 may be visible to the user 402 at the time the video is captured. Further, the video 400 may be used to authenticate the user 402 at or soon after (e.g., 1, 5, or 10 seconds after) the video 400 is captured by the camera, so the user 402 may be aware that the video has been captured and is being used to authenticate the user 402 to gain access to a protected resource. The example video 500 may be categorized as a genuine video because it depicts an authorized user and the authorized user 402 is shown directly in the video.

Figure 5A:
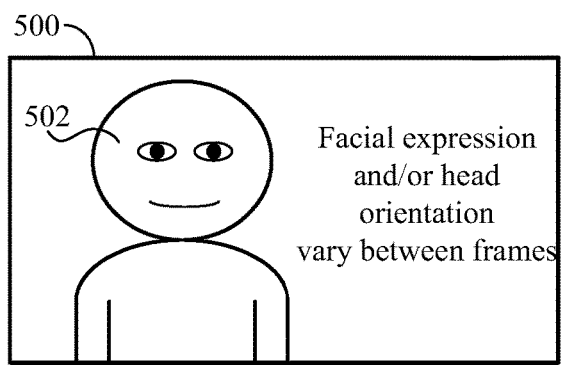
FIG. 5A illustrates an example fake video depicting an unauthorized user.

FIG. 5A illustrates an example fake video 500 depicting an unauthorized user 502. The unauthorized user 502 is not authorized to access any resources that are protected by the authentication service. The fake video 500 includes multiple frames, one of which is shown. The frames depict the unauthorized user 502. The unauthorized user 502 is shown directly in the video 500, e.g., the video 500 does not include any portions of other videos depicting the unauthorized user 502. Since the user 502 is not authorized, the video 500 is not a genuine video, and may be categorized as a fake video, despite the user 502 being shown directly in the video.

Figure 5B:
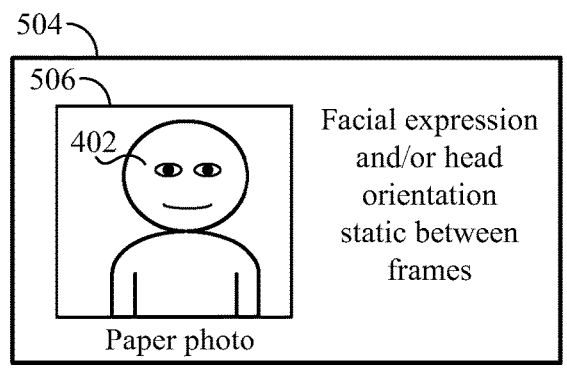
FIG. 5B illustrates an example fake video depicting a paper photo of an authorized user.
Figure 5C:
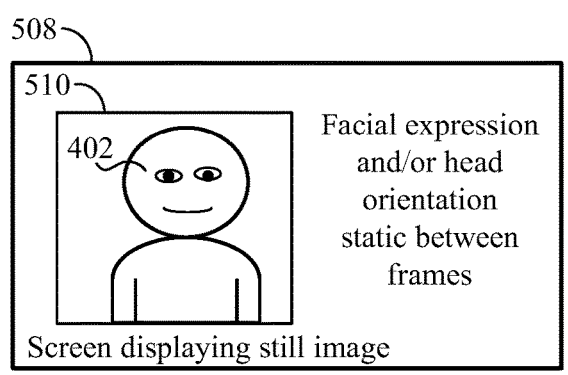
FIG. 5C illustrates an example fake video depicting a screen displaying a still image of an authorized user.
Figure 5D:
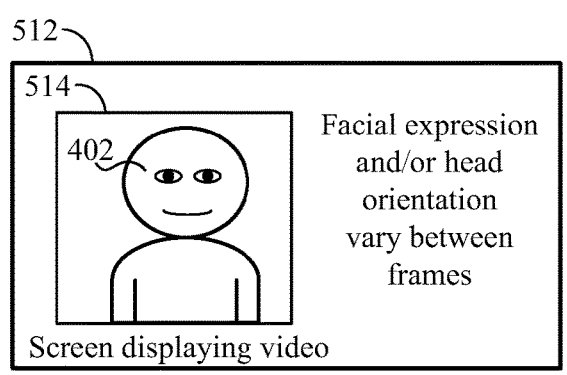
FIG. 5D illustrates an example fake video depicting a screen displaying a video of an authorized user.

FIG. 5B illustrates an example fake video 504 depicting a paper photo 506 of an authorized user 402. The fake video 504 includes multiple frames, one of which is shown. The frames depict the authorized user 402, including the authorized user's face. Since the authorized user 402 is shown in a paper photo 506, the facial expression shown on the face of the user 402, the orientation of the head of the user 402, or both, are static (e.g., do not vary) between frames. The authorized user 402 is shown indirectly in the video 504, since the video 504 includes frames depicting a paper photo 506 of the authorized user 402. For example, the camera that captures the video 504 may not be visible to the user 402 at the time the video is captured, because the camera is capturing the paper photo of the user 402. The example video 504 may be categorized as a fake video because the depicted authorized user 402 is shown indirectly in the video as a depiction of the paper photo 506.

FIG. 5C illustrates an example fake video 508 depicting a screen displaying a still image 510 of an authorized user 402. The fake video 508 includes multiple frames, one of which is shown. The frames depict the authorized user 402, including the authorized user's face. Since the authorized user 402 is shown in an embedded still image 510, the facial expression shown on the face of the user 402, the orientation of the head of the user 402, or both, are static (e.g., do not vary) between frames of the video 508. The authorized user 402 is shown indirectly in the video 508, since the video 508 depicts the still image 510 of the authorized user 402. For example, the camera that captures the video 508 may not be visible to the user 402 at the time the video is captured, because the camera is capturing the embedded still image 510 of the user 402. The example video 508 may be categorized as a fake video because the depicted authorized user 402 is shown indirectly in the video as a depiction of the embedded still image 510.

FIG. 5D illustrates an example fake video 512 depicting a screen displaying an embedded video 514 of an authorized user. The fake video 512 includes multiple frames, one of which is shown. The frames depict the authorized user 402, including the authorized user's face. Since the authorized user 402 is shown in an embedded video 514, the facial expression shown on the face of the user 402, the orientation of the head of the user 402, or both, vary between frames of the video 512. The authorized user 402 is shown indirectly in the video 512, since the video 512 depicts the video 514 of the authorized user 402. For example, the camera that captures the video 512 may not be visible to the user 402 at the time the video is captured, because the camera is capturing the video 514 of the user 402 (which may have been captured by a different camera). The example video 512 may be categorized as a fake video because the depicted authorized user 402 is shown indirectly in the video as a depiction of the embedded video 514.

Figure 6:
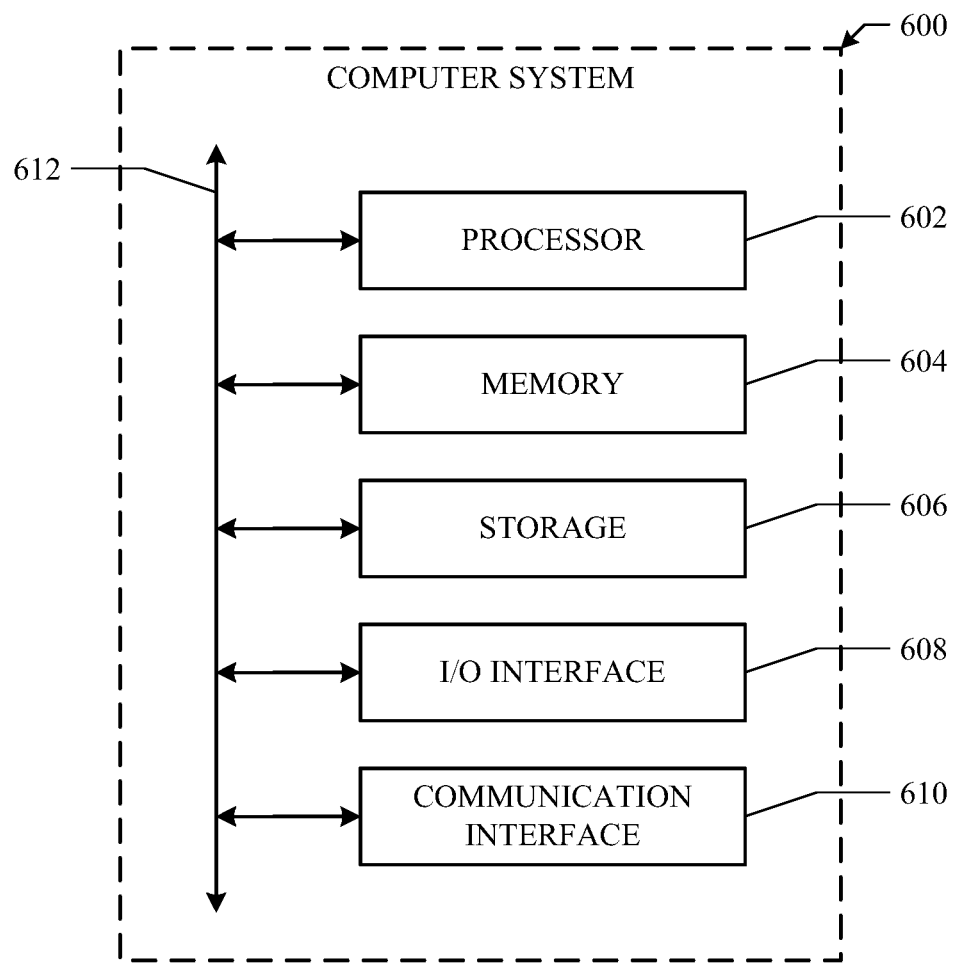
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include a hard disk drive (HDD), a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
    by one or more computing devices, accessing a plurality of verified videos depicting one or more subjects;
    by the one or more computing devices, generating, based on the verified videos, a plurality of verified-video feature values corresponding to the subjects;
    by the one or more computing devices, generating, by applying one or more pre-determined video transformations to each of the plurality of verified videos, a plurality of fake videos;
    by the one or more computing devices, generating, based on the fake videos, a plurality of fake-video feature values; and
    by the one or more computing devices, training, using the plurality of verified-video feature values and the plurality of fake-video feature values a machine-learning model to determine whether a specified video is a genuine video, wherein the machine-learning model is trained to distinguish between the plurality of verified-video feature values and the plurality of fake-video feature values.

2. The method of claim 1, wherein the machine-learning model is trained to classify the specified video in a genuine-video class or a fake-video class, and the machine-learning model is trained based on an association between a genuine-video class and the verified-video feature values and an association between a fake-video class and the fake-video feature values, the verified-video feature values comprising a verified-video histogram, and the fake-video feature values comprising a fake-video histogram.

3. The method of claim 1, wherein the plurality of verified-video feature values and the plurality of fake-video feature values each comprise one or more of: a color feature, a texture feature, an edge feature, a shape feature, or an image quality feature.

4. The method of claim 3, wherein the color feature comprises one or more of HSL (hue, saturation, lightness), HSV (hue, saturation, value), dominant color, color gradient, or color frequency histogram.

5. The method of claim 3, wherein the texture feature comprises one or more of a coarseness, contrast, directionality, line-likeness, regularity, roughness, or Grey Level Co-occurrence Matrix (GLCM).

6. The method of claim 3, wherein the edge feature comprises an edge histogram based on spatial distribution of edges.

7. The method of claim 3, wherein the shape feature comprises a region-based shape feature based on pixel distribution in an object or region, a contour-based shape feature based on contours of an object, or one or more Hu-Moment shape features.

8. The method of claim 3, wherein the image quality feature comprises one or more of distortion, contrast, or brightness.

9. The method of claim 1, further comprising:
    by the one or more computing devices, determining a plurality of verified-video computed values of a verified-video histogram, wherein each verified-video computed value is computed as a function of one or more of the verified-video feature values; and
    by the one or more computing devices, determining a plurality of fake-video computed values, of a fake-video histogram wherein each fake-video computed value is computed as a function of one or more of the fake-video feature values,
    wherein the machine-learning model is trained to distinguish between the verified-video computed values and the fake-video computed values.

10. The method of claim 1, wherein the verified-video feature values comprise verified-video feature vectors, and the fake-video feature values comprise fake-video feature vectors, the method further comprising:
    by the one or more computing devices, determining a plurality of verified-video distances, wherein each verified-video distance is based on a distance between a pair of the verified-video feature vectors; and
    by the one or more computing devices, determining a plurality of fake-video distances, wherein each fake-video distance is based on a distance between a pair of the fake-video feature vectors,
    wherein the machine-learning model is trained to distinguish between the verified-video distances and the fake-video distances.

11. The method of claim 1, wherein the verified-video feature values comprise verified-video feature vectors, and the fake-video feature values comprise fake-video feature vectors, the method further comprising:
by the one or more computing devices, determining a plurality of verified-video distances, wherein each verified-video distance is based on a distance between a pair of the verified-video feature vectors;
by the one or more computing devices, generating a verified-video histogram of the verified-video distances;
by the one or more computing devices, determining a plurality of fake-video distances, wherein each fake-video distance is based on a distance between a pair of the fake-video feature vectors; and
by the one or more computing devices, generating a fake-video histogram of the fake-video distances,
wherein the machine-learning model is trained to distinguish between the verified-video histograms and the fake-video histograms.

12. The method of claim 9, wherein the machine-learning model is trained based on:
an association between the verified-video computed values of the verified-video histogram and a genuine-video class, and
an association between the fake-video computed values of the fake-video histogram and a fake-video class.

13. The method of claim 1, wherein each of the verified videos is less than a threshold length.

14. The method of claim 1, wherein at least a portion of each of the one or more subjects in the verified videos moves at greater than a minimum threshold rate of speed.

15. The method of claim 1, wherein the one or more video transformations include image resizing, overlaying of rectangular border that enclosing faces, stopping motion, or a combination thereof.

16. The method of claim 1, wherein the one or more video transformations degrade a quality of the verified videos and comprise one or more of addition of noise, blurring, resolution reduction, color distortion, image compression, or affine transformations.

17. The method of claim 1, wherein the verified videos are live videos captured in real-time.

18. One or more computer-readable non-transitory storage media embodying software that is operable when executed to:
access verified videos depicting one or more subjects;
generate, based on the verified videos, a plurality of verified-video feature values corresponding to the subjects;
generate, using one or more video transformations based on the verified videos, a plurality of fake videos;
generate, based on the fake videos, a plurality of fake-video feature values; and
train, using the plurality of verified-video feature values and the plurality of fake-video feature values, a machine-learning model to determine whether a specified video is a genuine video, wherein the machine-learning model is trained to distinguish between the plurality of verified-video feature values and the plurality of fake-video feature values.

19. A system comprising:
one or more processors;
an input device;
an output device; and
one or more computer-readable non-transitory storage media coupled to one or more of the processors and comprising instructions operable when executed by one or more of the processors to cause the system to:
access verified videos depicting one or more subjects;
generate, based on the verified videos, a plurality of verified-video feature values corresponding to the subjects;
generate, by applying one or more pre-determined video transformations to each of the verified videos, a plurality of fake videos;
generate, based on the fake videos, a plurality of fake-video feature values; and
train a machine-learning model to determine whether a specified video is a genuine video, wherein the machine-learning model is trained based on the verified-video feature values and the fake-video feature values.

20. The system of claim 19, wherein the plurality of verified-video feature values and the plurality of fake-video feature values each comprise one or more of: a color feature, a texture feature, an edge feature, a shape feature, or an image quality feature.

* * * * *